(12) United States Patent
Hong et al.

(10) Patent No.: US 12,344,070 B2
(45) Date of Patent: Jul. 1, 2025

(54) VALVE DEVICE WITH MULTIPLE FLOW PASSAGES

(71) Applicant: DY AUTO Corporation, Anyang-si (KR)

(72) Inventors: Sung Jin Hong, Asan-si (KR); Su Hyun Choi, Asan-si (KR)

(73) Assignee: DY AUTO CORPORATION (KR)

( * ) Notice: Subject to any disclaimer, the term of this patent is extended or adjusted under 35 U.S.C. 154(b) by 23 days.

(21) Appl. No.: 18/376,800

(22) Filed: Oct. 4, 2023

(65) Prior Publication Data

US 2024/0133471 A1 Apr. 25, 2024
US 2024/0229947 A9 Jul. 11, 2024

(30) Foreign Application Priority Data

Oct. 19, 2022 (KR) .................. 10-2022-0134820

(51) Int. Cl.
*B60H 1/00* (2006.01)
*F16K 11/085* (2006.01)
*F16K 27/06* (2006.01)

(52) U.S. Cl.
CPC ...... *B60H 1/00278* (2013.01); *F16K 11/0856* (2013.01); *F16K 27/065* (2013.01)

(58) Field of Classification Search
CPC ............... F16K 11/0856; F16K 27/065; B60H 1/00485
See application file for complete search history.

(56) References Cited

U.S. PATENT DOCUMENTS

| | | | |
|---|---|---|---|
| 11,448,334 B2 * | 9/2022 | Jeong ................. | F16K 11/0856 |
| 12,123,505 B2 * | 10/2024 | Tiemeyer ............. | F16K 27/065 |
| 2006/0118066 A1 | 6/2006 | Martins | |
| 2014/0076454 A1 * | 3/2014 | Kjar ......................... | B65B 3/28 |
| | | | 141/83 |
| 2022/0163132 A1 | 5/2022 | Jeong et al. | |

FOREIGN PATENT DOCUMENTS

| | | |
|---|---|---|
| JP | 2006512540 | 4/2006 |
| KR | 20100134432 | 12/2010 |
| KR | 20220032772 | 3/2022 |
| KR | 20220071316 | 5/2022 |

OTHER PUBLICATIONS

Notice of Allowance for Korean Application No. 2022-134820, mailed Jun. 29, 2023.

* cited by examiner

*Primary Examiner* — Michael R Reid
(74) *Attorney, Agent, or Firm* — Klarquist Sparkman, LLP

(57) ABSTRACT

A valve device including a plurality of flow paths may include a valve case, a valve body rotatable on the valve case, and a valve cover covering and closing the valve case, in which the valve body includes an upper body including three independent flow paths, a center body coupled to a bottom of the upper body and installed to be rotatable integrally with the upper body, and a lower body coupled to a bottom of the center body, installed to be rotatable integrally with the center body, and including three independent flow paths each including input/output ports.

4 Claims, 10 Drawing Sheets

Mode 2

Mode 3

Mode 4

VALVE DEVICE WITH MULTIPLE FLOW PASSAGES

CROSS-REFERENCE TO RELATED APPLICATIONS

This application is based on and claims priority under 35 U.S.C. § 119 to Korean Patent Application No. 10-2022-0134820, filed on Oct. 19, 2022, in the Korean Intellectual Property Office, the disclosure of which is incorporated by reference herein in its entirety.

BACKGROUND

1. Field

The disclosure relates to a valve device applicable to an integrated thermal management module of an electric vehicle.

2. Description of the Related Art

Internal combustion engine vehicles obtain driving power from engines that convert heat energy generated by burning fossil fuels such as oil into mechanical energy. Recently, however, the usage of electric vehicles, which are eco-friendly vehicles that obtain driving power by converting electrical energy into mechanical energy without using fossil fuels, has been increasing.

Electric vehicles have a very high proportion of batteries that store a large amount of electrical energy. Battery performance is very sensitive to temperature. Thus, to maintain optimal battery performance, it is desirable to keep battery temperature within a certain range. An electric vehicle includes a power electric (PE) system that generates power to drive the vehicle. The PE system includes a motor, an inverter, and a decelerator. To adjust battery temperature, waste heat generated in the PE system may be used. It is necessary to variously diversify a path through which a coolant circulates according to various modes. Such diversification of the path of the coolant may be implemented by a valve device. As a valve device, a module including a plurality of 3-way valves has been conventionally used. However, such a valve device in the art requires a plurality of actuators for operating the valves and has an increased volume of the module, and thus occupies a large package space.

SUMMARY

Provided is a valve device which has a small volume and configures various coolant circulation paths with a single actuator by improving a structure of a valve device applied to an integrated thermal management system of an electric vehicle.

Additional aspects will be set forth in part in the description which follows and, in part, will be apparent from the description, or may be learned by practice of the presented embodiments.

According to an aspect of the disclosure, a valve device including a plurality of flow paths includes a valve case including an open top, a valve body rotatably installed on the valve case, and a valve cover covering and closing an upper portion of the valve case, in which the valve body includes an upper body including three independent flow paths, each including input/output ports, a center body coupled to a bottom of the upper body and installed to be rotatable integrally with the upper body, and a lower body coupled to a bottom of the center body, installed to be rotatable integrally with the center body, and including three independent flow paths, each including input/output ports, and the upper body includes a first flow path including input/output ports arranged with an interval of 60° therebetween, a second flow path including input/output ports, which have an interval of 60° from the input/output ports of the first flow path and are arranged with an interval of 180° therebetween, and a third flow path including input/output ports having an interval of 60° from the input/output ports of the second flow path and arranged on an opposite side of the first flow path with respect to the second flow path, and the lower body includes a fourth flow path including input/output ports arranged with an interval of 60° therebetween, a fifth flow path formed to have a shape that is identical to that of the fourth flow path and arranged with an interval of 60° from the fourth flow path with respect to a central axis of rotation of the valve body, and a sixth flow path formed to have a shape that is identical to that of the fifth flow path and arranged with an interval of 60° from the fifth flow path with respect to the central axis of rotation of the valve body, and the first flow path to the sixth flow path are formed along a surface perpendicular to the central axis of rotation of the valve body, and the input/output ports formed in the upper body and the input/output ports formed in the lower body are arranged to be staggered by 30° with respect to the central axis of rotation of the valve body, and the valve case includes six upper connection ports arranged with intervals of 60° to correspond to the input/output ports of the first flow path to the third flow path and six lower connection ports arranged under the upper connection ports in parallel with the upper connection ports to correspond to the input/output ports of the fourth flow path to the sixth flow path, and the upper connection ports and the lower connection ports arranged at same angles in a circumferential direction of the central axis of rotation of the valve body are connected to each other to form one case input/output port.

A valve seal formed of a rubber material may be installed between the valve case and the valve body, and the valve seal may be fixed to the valve case.

The upper body and the lower body may be coupled to the center body by an uneven structure.

The valve device may further include an actuator coupling portion having a bar pillar shape, formed to pass through the valve cover from a center of a top surface of the upper body to protrude upwardly from the valve cover, in which the actuator coupling portion is formed to have a noncircular cross-section.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
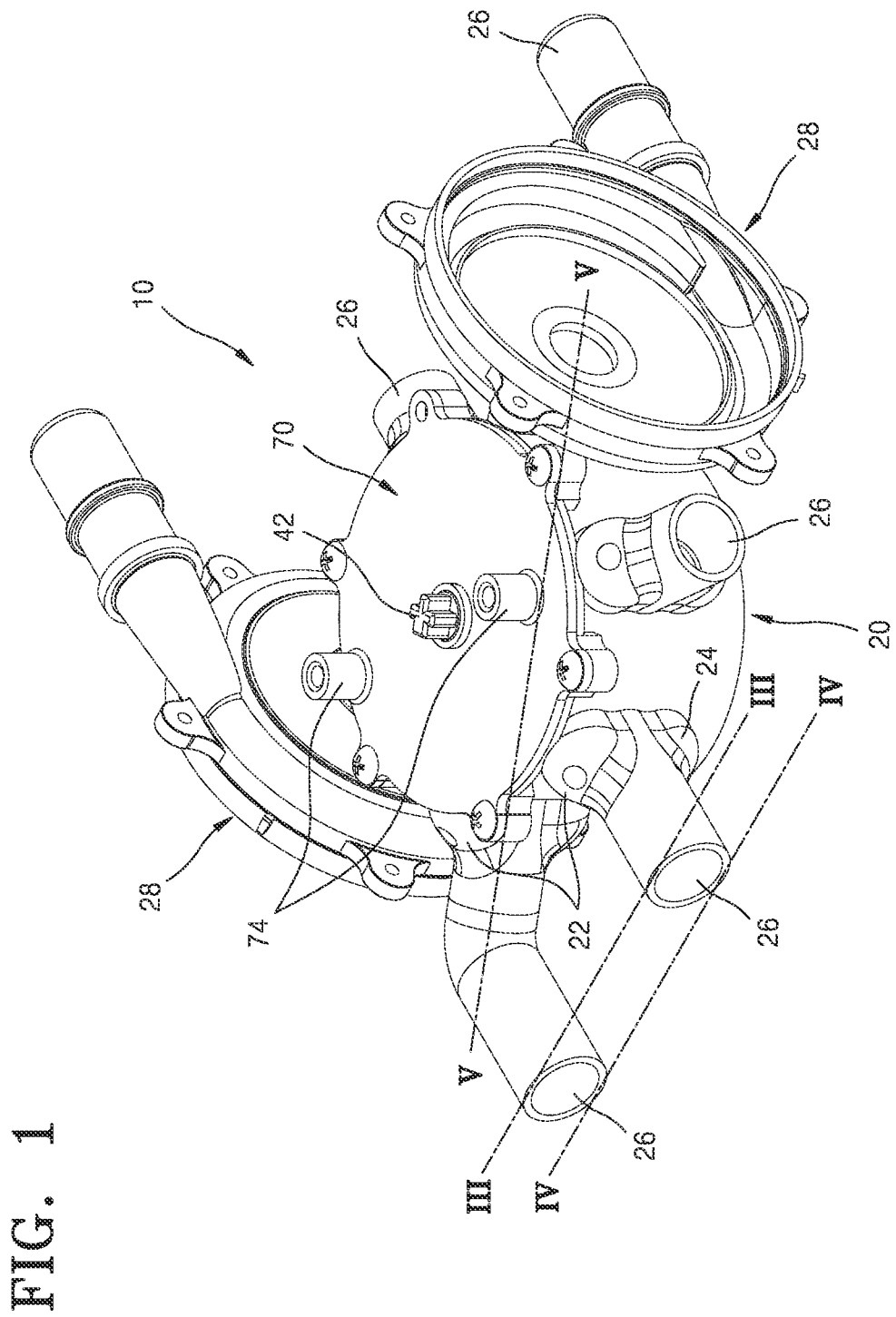
FIG. 1 is a perspective view of a valve device according to an embodiment.

Reference will now be made in detail to embodiments, examples of which are illustrated in the accompanying drawings, wherein like reference numerals refer to like components throughout. In this regard, the present embodiments may have different forms and should not be construed as being limited to the descriptions set forth herein. Accordingly, the embodiments are merely described below, by referring to the figures, to explain aspects of the present description.

Hereinafter, a preferred embodiment according to the present disclosure will be described in detail with reference to the accompanying drawings.

Figure 2:
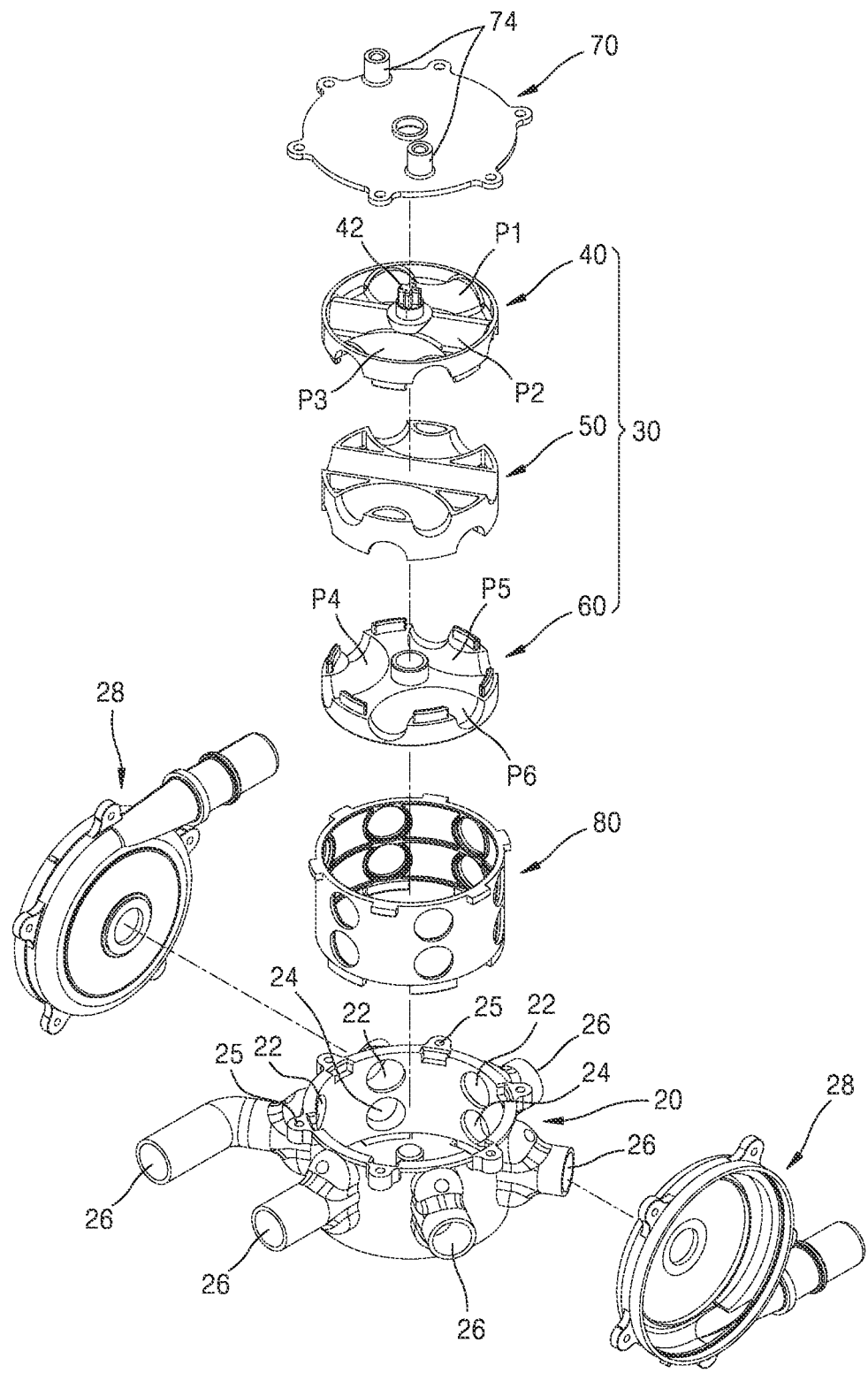
FIG. 2 is an exploded perspective view of a valve device shown in FIG. 1.
Figure 3:
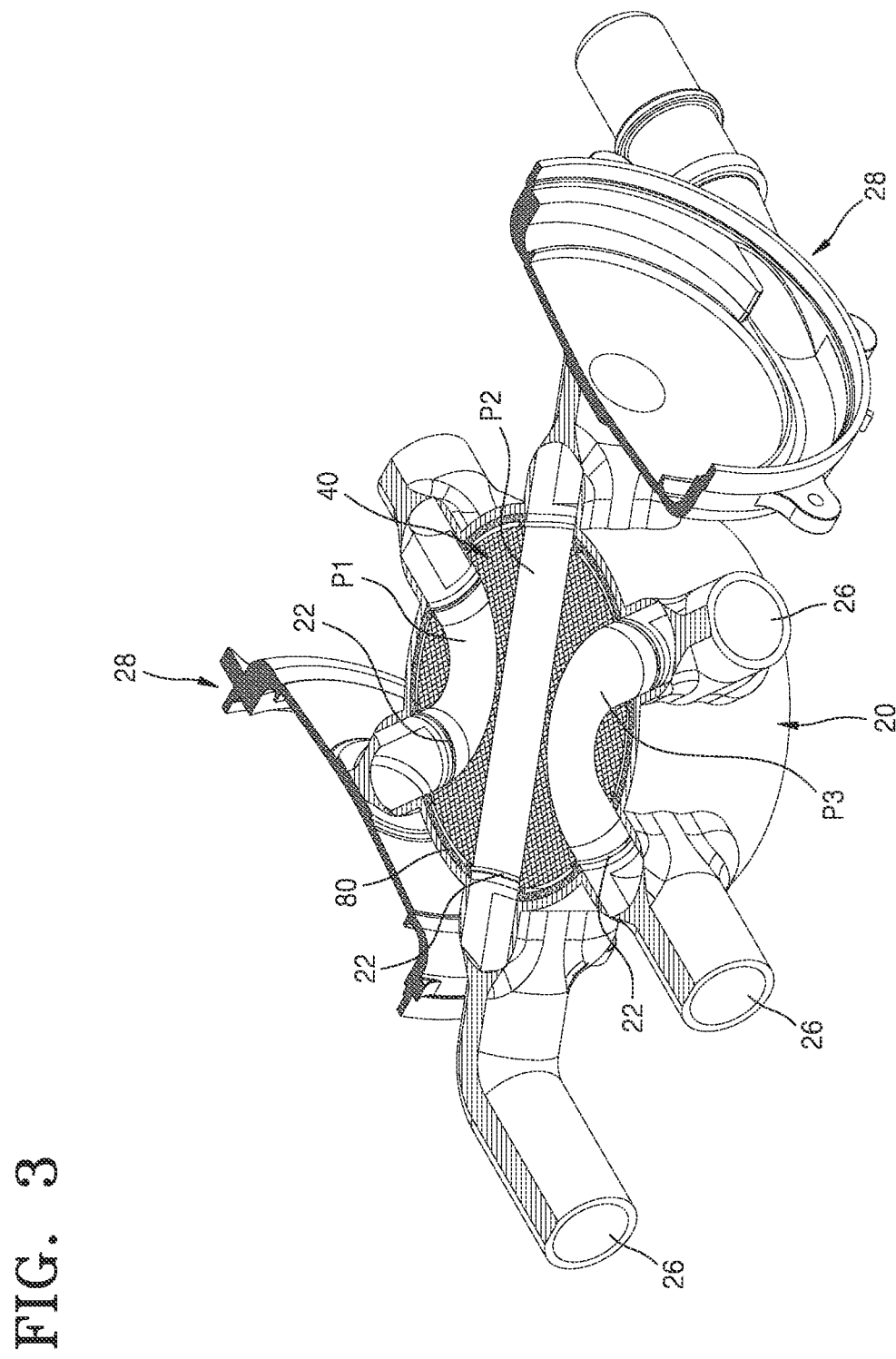
FIG. 3 is a cross-sectional view taken along a line III-III shown in FIG. 1.
Figure 4:
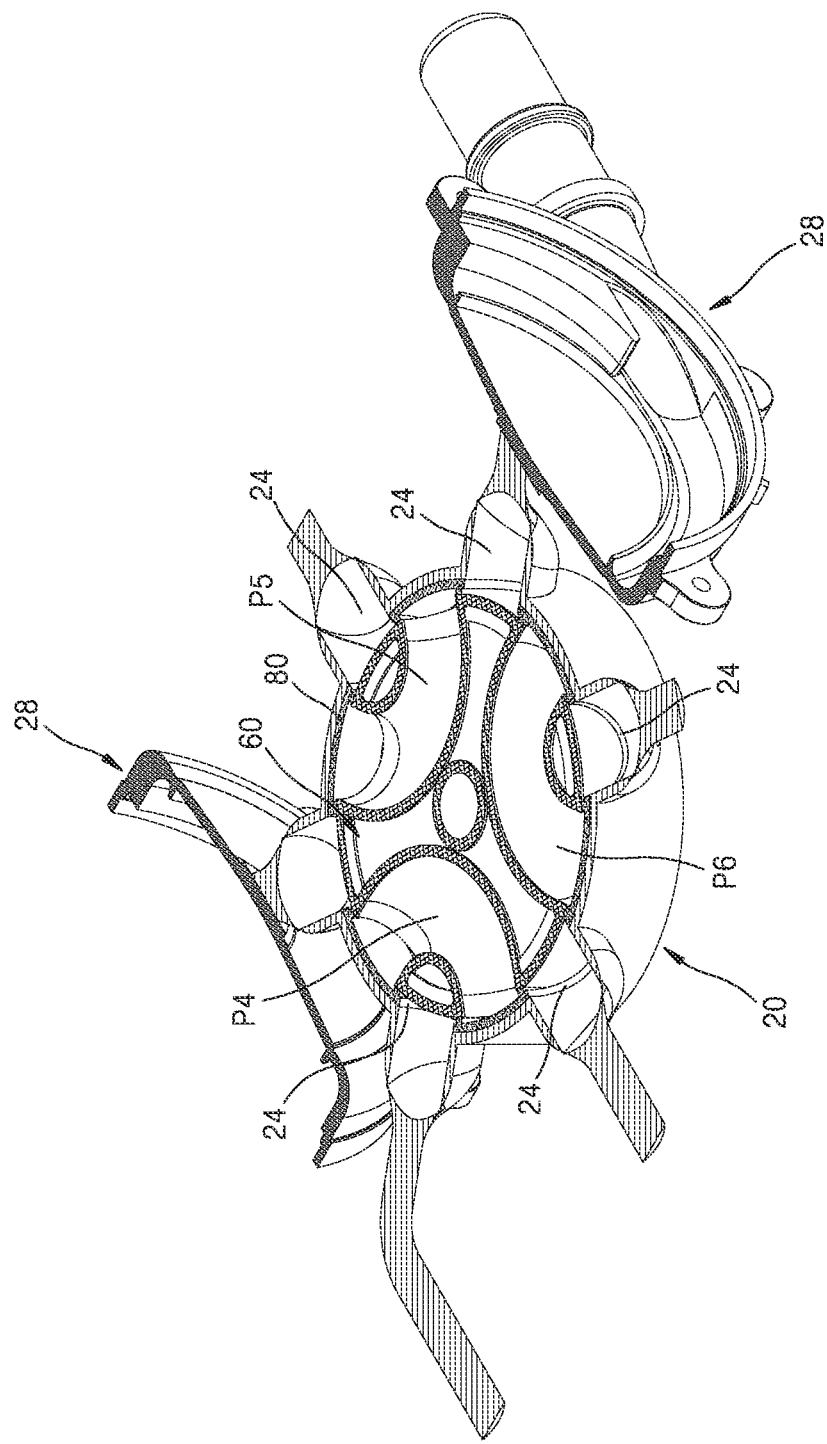
FIG. 4 is a cross-sectional view taken along a line IV-IV shown in FIG. 1.
Figure 5:
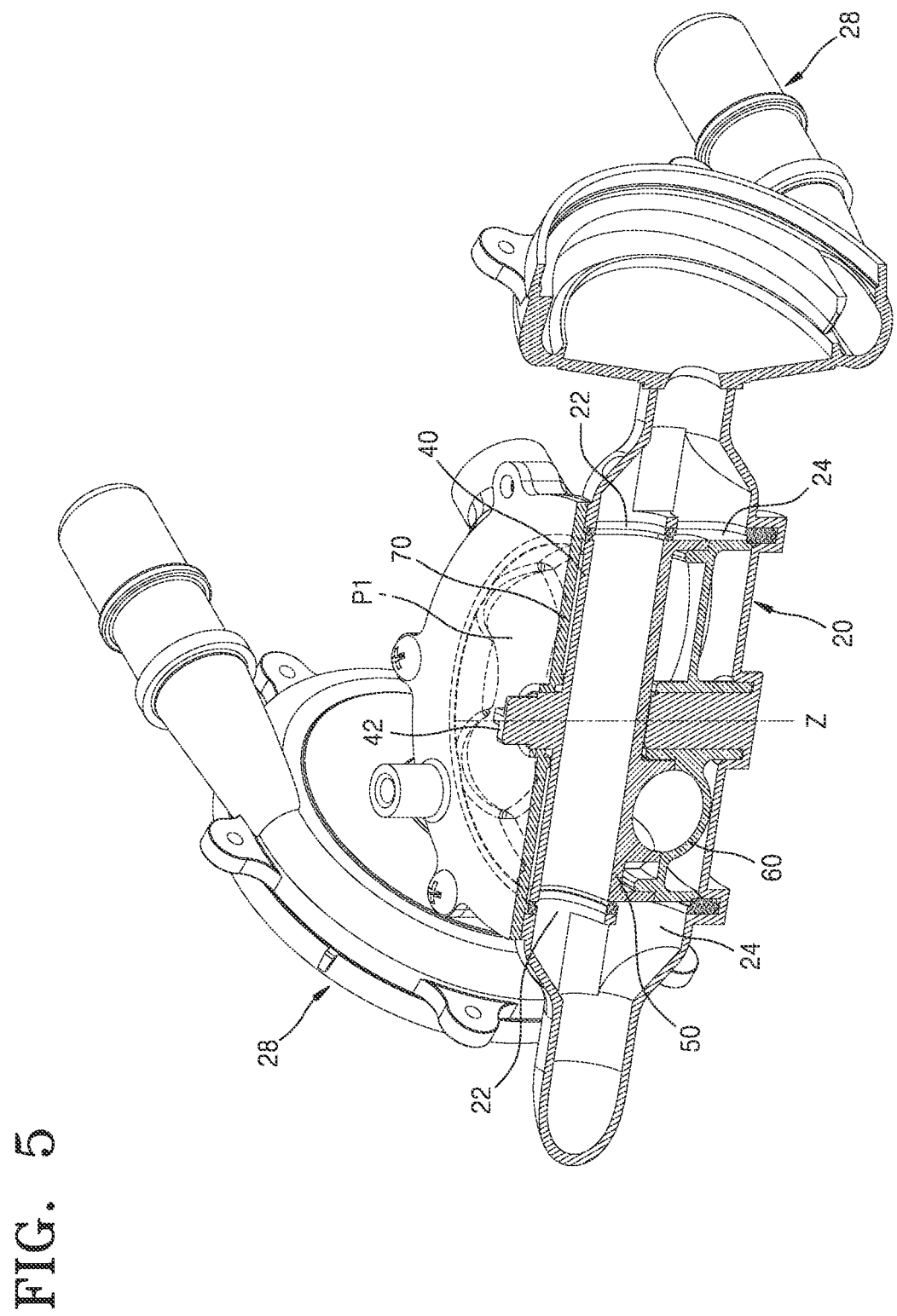
FIG. 5 is a cross-sectional view taken along a line V-V shown in FIG. 1.
Figure 6:
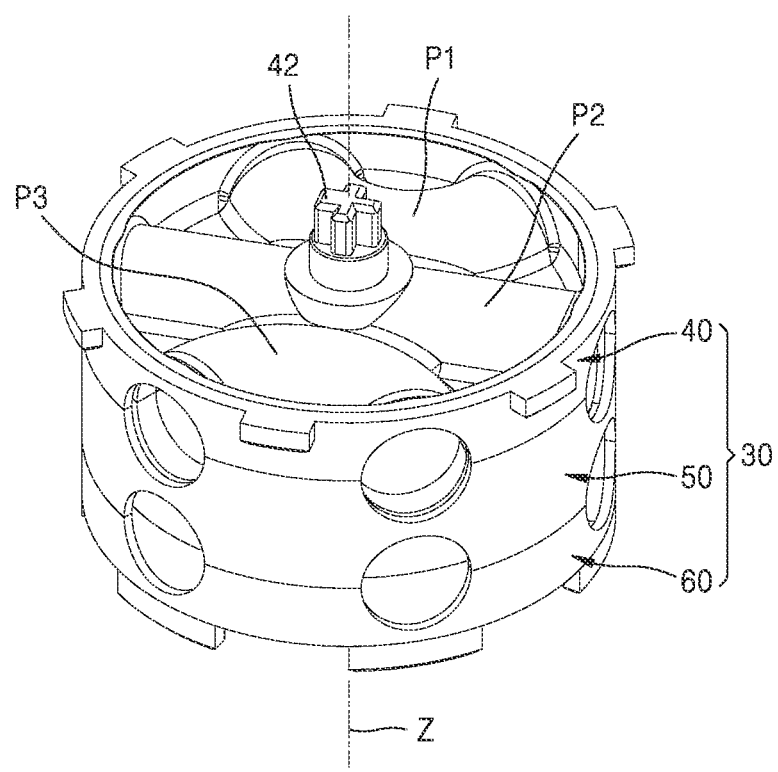
FIG. 6 is a perspective view of a valve body in which an upper body, a center body, and a lower body, shown in FIG. 2, are coupled to one another.
Figure 7:
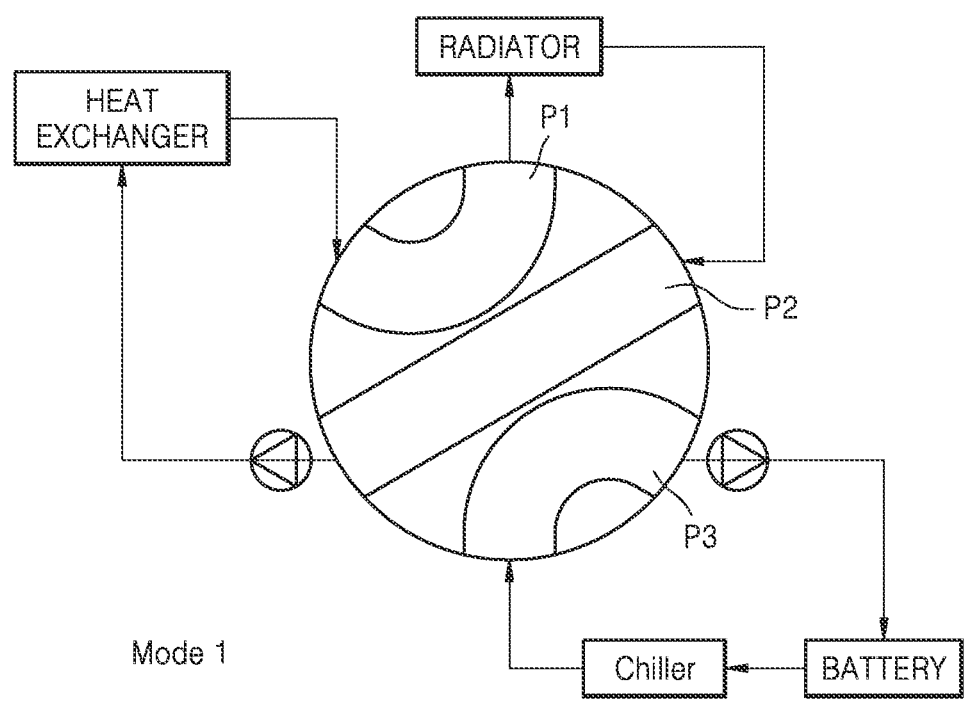
FIG. 7 is a view showing a first mode of a coolant circulation path of an electric vehicle implemented using a valve device according to the disclosure.
Figure 9:
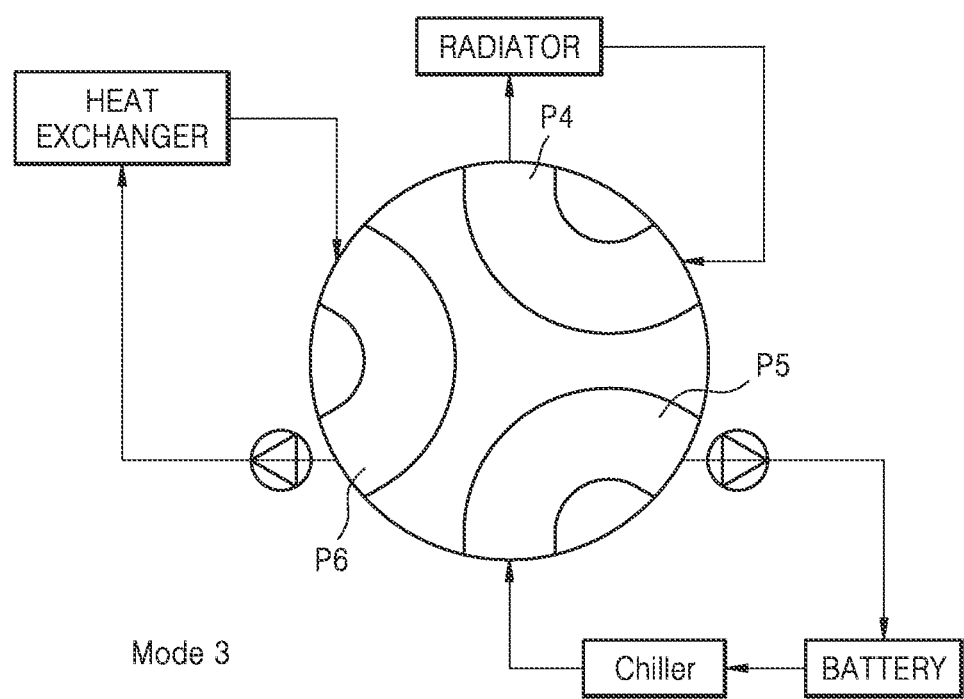
FIG. 9 is a view showing a third mode of a coolant circulation path of an electric vehicle implemented using a valve device according to the disclosure.
Figure 10:
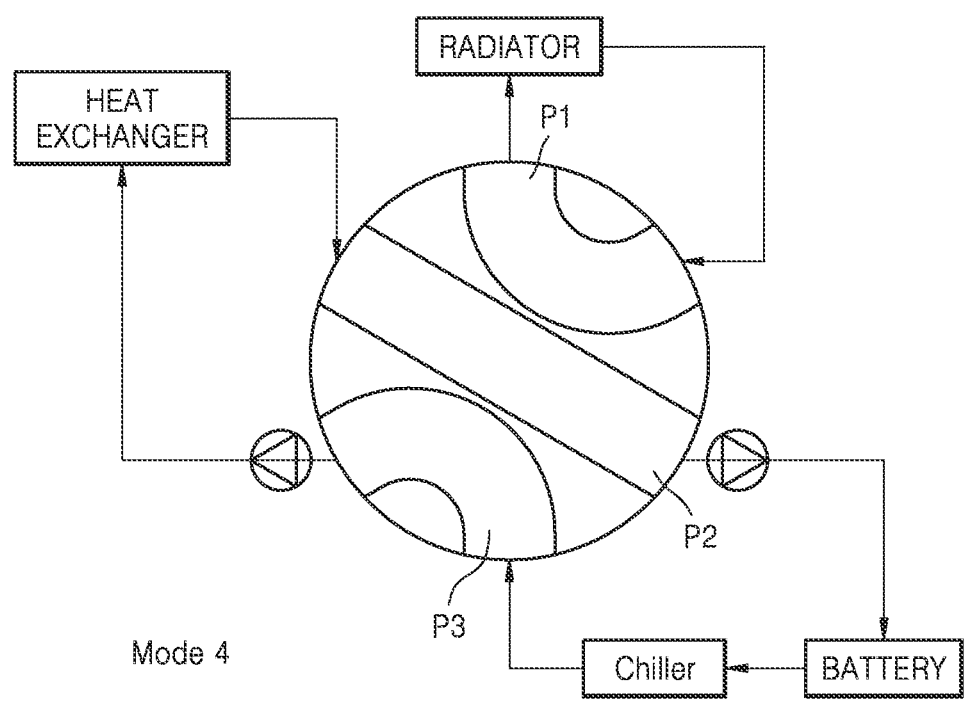
FIG. 10 is a view showing a fourth mode of a coolant circulation path of an electric vehicle implemented using a valve device according to the disclosure.

FIG. 1 is a perspective view of a valve device according to an embodiment. FIG. 2 is an exploded perspective view of a valve device shown in FIG. 1. FIG. 3 is a cross-sectional view taken along a line III-III shown in FIG. 1. FIG. 4 is a cross-sectional view taken along a line IV-IV shown in FIG. 1. FIG. 5 is a cross-sectional view taken along a line V-V shown in FIG. 1. FIG. 6 is a perspective view of a valve body in which an upper body, a center body, and a lower body, shown in FIG. 2, are coupled to one another. FIG. 7 is a view showing a first mode of a coolant circulation path of an electric vehicle implemented using a valve device according to the disclosure. FIG. 7 is a view showing a second mode of a coolant circulation path of an electric vehicle implemented using a valve device according to the disclosure. FIG. 9 is a view showing a third mode of a coolant circulation path of an electric vehicle implemented using a valve device according to the disclosure. FIG. 10 is a view showing a fourth mode of a coolant circulation path of an electric vehicle implemented using a valve device according to the disclosure.

Referring to FIGS. 1 to 10, a valve device 10 including a plurality of flow paths according to an embodiment (hereinafter, referred to as a "valve device") may include a valve case 20, a valve body 30, a valve cover 70, and a valve seal 80.

The valve case 20 may be a structure having an open top. The valve case 20 may include an inner space in a cylindrical shape. The valve case 20 may include, on an inner wall thereof, a plurality of upper connection ports 22 and a plurality of lower connection ports 24, which are formed to communicate the inner space with an outside. Six upper connection ports 22 may be provided at intervals of 60° along a circumference of the inner wall of the valve case 20. The lower connection ports 24 may be formed under the upper connection ports 22. The lower connection ports 24 may be arranged at the same angular positions as the upper connection ports 22. Each upper connection port 22 and each lower connection port 24, which are arranged at the same angle along the circumference of the inner wall of the valve case 20, may be connected to each other to form a corresponding case input/output port 26. Thus, six case input/output ports 26 may be formed. A port adaptor 28 may be connected to some of the case input/output ports 26. The port adaptor 28 may be a structure for improving connectivity with another device connected to the valve case 20. The valve case 20 may include, on a top portion thereof, a plurality of engage holes 25 for fixing a valve cover 70 described below.

The valve body 30 may be installed rotatably on the valve case 20. The valve body 30 may be installed to be accommodated in the inner space of the valve case 20. The valve body 30 may be installed rotatably with respect to the valve case 20 around a central axis of rotation Z. A detailed structure of the valve body 30 will be later described in more detail.

The valve cover 70 may be a structure that covers and closes an upper portion of the valve case 20. The valve cover 70 may be firmly fixed to the engaging hole 25 provided in the valve case 20, by a coupling means such as a screw. In a central portion of the valve cover 70, a through-hole may be provided to pass an actuator coupling portion 42 described below therethrough. In addition, a plurality of coupling guides 74 in a pillar shape to guide a coupling position of an actuator (not shown) may be provided on a top surface of the valve cover 70.

The valve body 30 may include an upper body 40, a center body 50, and a lower body 60.

The upper body 40 may include three independent flow paths, each of which includes input/output ports. That is, three independent flow paths may be provided in the upper body 40. The three flow paths provided in the upper body 40 may be defined as a first flow path P1, a second flow path P2, and a third flow path P3, respectively. The first flow path P1 to the third flow path P3 may form independent flow paths without intersecting each other.

The center body 50 may be coupled to a bottom of the upper body 40. The center body 50 may be installed to be rotatable integrally with the upper body 40. The center body 50 and the upper body 40 may be fixed to each other by an uneven structure. The top of the center body 50 may form a part of the first flow path P1, the second flow path P2, and the third flow path P3.

The lower body 60 may be coupled to a bottom of the center body 50. The lower body 60 may be installed to be rotatable integrally with the center body 50. The center body 50 and the lower body 60 may be fixed to each other by an uneven structure. The lower body 60 may include three independent flow paths, each of which includes input/output ports. The three flow paths provided in the lower body 60 may be defined as a fourth flow path P4, a fifth flow path P5, and a sixth flow path P6, respectively. The fourth flow path P4 to the sixth flow path P6 may form independent flow paths without intersecting each other. The bottom of the center body 50 may form a part of the fourth flow path P4, the fifth flow path P5, and the sixth flow path P6.

The input/output ports of the first flow path P1 may be arranged with an interval of 60° therebetween. The input/output ports of the second flow path P2 may have an interval of 60° from the input/output ports of the first flow path P1. The input port and the output port of the second flow path P2 may be arranged with an interval of 180° therebetween. That is, the second flow path P2 may have a linear shape penetrating the center of rotation of the upper body 40. The input/output ports of the third flow path P3 may have an interval of 60° from the input/output ports of the second flow path P2. The third flow path P3 may be arranged on an opposite side to the first flow path P1 with respect to the second flow path P2. The first flow path P1 and the third flow path P3 may be arranged as mirror images with respect to the second flow path P2.

The input/output ports of the fourth flow path P4 may be arranged with an interval of 60° therebetween. The fifth flow path P5 may be formed to have a shape that is identical to that of the fourth flow path P4. The fifth flow path P5 may be arranged with an interval of 60° from the fourth flow path P4 with respect to the central axis of rotation Z of the valve body 30. The sixth flow path P6 may be formed to have a shape that is identical to that of the fifth flow path P5. The sixth flow path P6 may be arranged with an interval of 60° from the fifth flow path P5 with respect to the central axis of rotation Z of the valve body 30.

The first flow path P1 to the sixth flow path P6 may be formed along a surface perpendicular to the central axis of rotation Z of the valve body 30. The first flow path P1 to the sixth flow path P6 may form independent flow paths without spatially intersecting each other in the valve body 30.

The input/output ports formed in the upper body 40 and the input/output ports formed in the lower body 60 may be arranged to be staggered by 30° with respect to the central axis of rotation Z of the valve body 30. That is, as the input/output ports of the first flow path P1 to the sixth flow path P6 are arranged to be staggered by an interval of 30° in a circumferential direction of the central axis of rotation Z of the valve body 30, 12 input/output ports may be arranged at different positions without overlapping each other in the circumferential direction of the central axis of rotation Z of the valve body 30.

The upper connection ports 22 and the lower connection ports 24 provided in the valve case 20 will be described in more detail.

Six upper connection ports 22 may be arranged with intervals of 60° to correspond to the input/output ports of the first flow path P1 to the third flow path P3. The lower connection ports 24 may be arranged under the upper connection ports 22 in parallel with the upper connection ports 22. Six lower connection ports 24 may be provided to correspond to the input/output ports of the fourth flow path P4 to the sixth flow path P6.

As described above, the upper connection port 22 and the lower connection port 24, which are arranged at the same angle in the circumferential direction of the central axis of rotation Z of the valve body 30, may be connected to each other to form one case input/output port 26.

The valve seal 80 may be installed between the valve case 20 and the valve body 30. The valve seal 80 may be formed of a rubber material. The valve seal 80 may include holes corresponding to the upper connection port 22 and the lower connection port 24. The valve seal 80 may be fixed to the valve case 20. The valve seal 80 may be non-rotatably coupled to the valve case 20 by an uneven structure.

The actuator coupling portion 42 may be provided to protrude upwardly from the center of the top surface of the upper body 50. The actuator coupling portion 42 may be a structure in a bar pillar shape. A lower end of the actuator coupling portion 42 may be connected to the upper body 40, and an upper end of the actuator coupling portion 42 may form a free end. The actuator coupling portion 42 may be formed to pass through the valve cover 70 to protrude upwardly from the valve cover 70. The top portion of the actuator coupling portion 42 may be formed to have a noncircular cross-section. For example, the top portion of the actuator coupling portion 42 may have a transverse section in the shape of "+".

Hereinbelow, working effects will be described in detail by exemplifying various operation modes of the valve device 10 including the above-described components.

The valve device 10 according the disclosure may include three flow paths in the upper body 40 and three flow paths in the lower body 60. Three components may be connected to the case input/output port 26. For example, a radiator, a heat exchanger, and a cooling line for cooling a battery system among components of an electric vehicle may be connected to the input/output ports of the valve case 20.

First, referring to FIG. 7, a description will be made of a case where a circulation path of a coolant is configured in a first mode. The first mode may be configured such that the coolant may circulate through the radiator and the heat exchanger in one loop and the coolant may circulate in a separate loop in the battery. The first mode may be configured using the first flow path P1, the second flow path P2, and the third flow path P3, provided in the upper body 40. For convenience, a description will start from a state where the first flow path P1, the second flow path P2, and the third flow path P3, provided in the upper body 40, are at positions shown in FIG. 7. When the valve body 30 is set in the state shown in FIG. 7, the fourth flow path P4, the fifth flow path P5, and the sixth flow path P5, formed in the lower body 60, may be disconnected from the lower connection ports 24 of the valve case 20 and thus may be closed. Meanwhile, one of the input/output ports of the first flow path P1 may be connected to the radiator, and the other of the input/output ports of the first flow path P1 may be connected to the heat exchanger. One of the input/output ports of the second flow path P2 may be connected to the radiator, and the other of the input/output ports of the second flow path P2 may be connected to the heat exchanger. One of the input/output ports of the third flow path P3 may be connected to the battery, and the other of the input/output ports of the third flow path P3 may be connected to a chiller serially connected to the battery.

In this state, when the coolant is forcedly circulated by a pump, the first flow path P1 and the second flow path P2 may form a coolant circulation path to allow the coolant to sequentially flow through the radiator and the heat exchanger. Meanwhile, the third flow path P3 may form a coolant circulation path to allow the coolant to circulate through the battery and the chiller.

Figure 8:
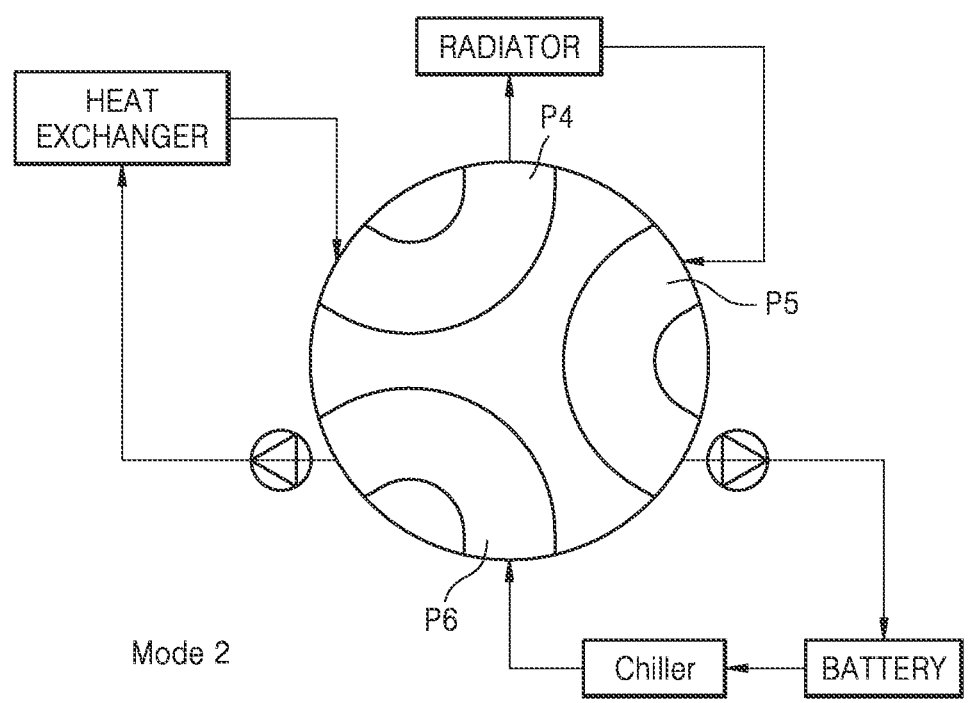
FIG. 8 is a view showing a second mode of a coolant circulation path of an electric vehicle implemented using a valve device according to the disclosure.

In the state shown in FIG. 7, the valve body 30 may be rotated by 309n a clockwise direction as shown in FIG. 8. As a result, a second mode may be configured. In the second mode, the first flow path P1, the second flow path P2, and the third flow path P3, provided in the upper body 40, may be disconnected from the upper connection ports 22. Meanwhile, the fourth flow path P4, the fifth flow path P5, and the sixth flow path P6, provided in the valve case 20, may be connected to the lower connection ports 24 provided in the valve case 20. Thus, the fourth flow path P4, the fifth flow path P5, and the sixth flow path P6, provided in the lower body 60, may be connected to the case input/output ports 26. One of the input/output ports of the fourth flow path P4 may be connected to the radiator, and the other of the input/output ports of the fourth flow path P4 may be connected to the heat exchanger. One of the input/output ports of the fifth flow path P5 may be connected to the radiator, and the other of the input/output ports of the fifth flow path P5 may be connected to the battery. One of the input/output ports of the sixth flow path P6 may be connected to the chiller serially connected to the battery, and the other of the input/output ports of the sixth flow path P6 may be connected to the heat exchanger. As a result, a path is formed through which the coolant passes through the heat exchanger from the radiator via the battery and the chiller and then circulates back to the radiator. As such, in the second mode, a coolant circulation path may be formed such that the coolant circulates through the radiator, the battery, and the heat exchanger in one loop.

In the state shown in FIG. 8, the valve body 30 may be further rotated by 309n the clockwise direction or a counterclockwise direction as shown in FIG. 9. As a result, a third mode may be configured. In the third mode, the first flow path P1, the second flow path P2, and the third flow path P3, provided in the upper body 40, may be disconnected from the upper connection ports 22. Meanwhile, the fourth flow path P4, the fifth flow path P5, and the sixth flow path P6, provided in the valve case 20, may be connected to the lower connection ports 24 provided in the valve case 20. Thus, the fourth flow path P4, the fifth flow path P5, and the sixth flow path P6, provided in the upper body 40, may be connected to the case input/output ports 26. One of the input/output ports of the fourth flow path P4 may be connected to the radiator, and the other of the input/output ports of the fourth flow path P4 may also be connected to the radiator. One of the input/output ports of the fifth flow path P5 may be connected to the battery, and the other of the input/output ports of the fifth flow path P5 may be connected to the chiller serially connected to the battery. One of the input/output ports of the sixth flow path P6 may be connected to the heat exchanger, and the other of the input/output ports of the sixth flow path P6 may also be connected to the heat exchanger. As a result, a path may be configured through which the coolant may independently circulate through each of the radiator, the battery, and the heat exchanger. As such, in the third mode, a coolant circulation path may be formed such that the coolant independently circulates through the radiator, the battery, and the heat exchanger.

In the state shown in FIG. 7, the valve body 30 may be rotated by 609n the clockwise direction as shown in FIG. 10. As a result, a fourth mode may be configured. In the fourth mode, the first flow path P1, the second flow path P2, and the third flow path P3, provided in the upper body 40, may be connected to the upper connection ports 22. Meanwhile, the fourth flow path P4, the fifth flow path P5, and the sixth flow path P6, provided in the valve case 20, may be disconnected from the lower connection ports 24 provided in the valve case 20. Thus, the first flow path P1, the second flow path P2, and the second flow path P3, provided in the upper body 40, may be connected to the case input/output ports 26. In the fourth mode, one of the input/output ports of the first flow path P1 may be connected to the radiator, and the other of the input/output ports of the first flow path P1 may also be connected to the radiator. One of the input/output ports of the second flow path P2 may be connected to the battery, and the other of the input/output ports of the second flow path P2 may be connected to the heat exchanger. One of the input/output ports of the third flow path P3 may be connected to the chiller serially connected to the battery, and the other of the input/output ports of the third flow path P3 may be connected to the heat exchanger.

In this state, when the coolant is forcedly circulated by the pump, a path may be formed through which the coolant circulates in the radiator through the first flow path P1 and a path may be formed through which the coolant circulates in the battery and the heat exchanger in one loop through the second flow path P2 and the third flow path P3.

In addition to flow path configurations shown in FIGS. 7 and 10, a fifth mode, although not shown, may be implemented by, for example, rotating the valve body 30 by 60° in the counterclockwise direction. In the fifth mode, when the coolant is forcedly circulated by the pump, a path may be formed through which the coolant circulates in the heat exchanger through the first flow path P1 and a path may be formed through which the coolant circulates in the radiator and the battery in one loop through the second flow path P2 and the third flow path P3.

As described above, the valve device including the plurality of flow paths according to the disclosure may open the three flow paths provided in the upper body or open the three flow paths provided in the lower body by rotating the valve body by 30° with one actuator, in which the three flow paths provided in the upper body may form three different flow paths according to a rotating position of the valve body, and the three flow paths provided in the lower body may form two different flow paths, thereby configuring a total of 5 modes of flow paths with one valve.

The valve device including a plurality of flow paths according to the disclosure has a small volume and various flow path configurations that may be implemented, thereby significantly improving the efficiency of a cooling module such as a battery of an electric vehicle, etc.

So far, the disclosure has been described in detail with preferred embodiments, but the disclosure is not limited to the above embodiments, and it may be apparent that many variations are possible within the technical spirit of the disclosure by those of ordinary skill in the art.

The valve device including the plurality of flow paths according to the disclosure may open the three flow paths provided in the upper body or open the three flow paths provided in the lower body by rotating the valve body by 30° with one actuator, in which the three flow paths provided in the upper body may form three different flow paths according to a rotating position of the valve body, and the three flow paths provided in the lower body may form two different flow paths, thereby configuring a total of 5 modes of flow paths with one valve.

The valve device including a plurality of flow paths according to the disclosure has a small volume and various flow path configurations that may be implemented, thereby significantly improving the efficiency of a cooling module such as a battery of an electric vehicle, etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A valve device comprising a plurality of flow paths, the valve device comprising:
   a valve case comprising an open top;
   a valve body rotatably installed on the valve case; and
   a valve cover covering and closing an upper portion of the valve case,
   wherein the valve body comprises:
   an upper body comprising three independent flow paths each comprising input/output ports;

a center body coupled to a bottom of the upper body and installed to be rotatable integrally with the upper body; and a lower body coupled to a bottom of the center body, installed to be rotatable integrally with the center body, and comprising three independent flow paths each comprising input/output ports, and the upper body comprises a first flow path comprising input/output ports arranged with an interval of 60° therebetween, a second flow path comprising input/output ports that have an interval of 60° from the input/output ports of the first flow path and are arranged with an interval of 180° therebetween, and a third flow path comprising input/output ports having an interval of 60° from the input/output ports of the second flow path and arranged on an opposite side of the first flow path with respect to the second flow path, and the lower body comprises a fourth flow path comprising input/output ports arranged with an interval of 60° therebetween, a fifth flow path formed to have a shape identical to that of the fourth flow path and arranged with an interval of 60° from the fourth flow path with respect to a central axis of rotation of the valve body, and a sixth flow path formed to have a shape identical to that of the fifth flow path and arranged with an interval of 60° from the fifth flow path with respect to the central axis of rotation of the valve body, and the first flow path to the sixth flow path are formed along a surface perpendicular to the central axis of rotation of the valve body, and the input/output ports formed in the upper body and the input/output ports formed in the lower body are arranged to be staggered by 30° with respect to the central axis of rotation of the valve body, and the valve case comprises:

six upper connection ports arranged with intervals of 60° to correspond to the input/output ports of the first flow path to the third flow path; and six lower connection ports arranged under the upper connection ports in parallel with the upper connection ports to correspond to the input/output ports of the fourth flow path to the sixth flow path, and the upper connection ports and the lower connection ports arranged at same angles in a circumferential direction of the central axis of rotation of the valve body are connected to each other to form one case input/output port.

2. The valve device of claim 1, wherein a valve seal formed of a rubber material is installed between the valve case and the valve body, and the valve seal is fixed to the valve case.

3. The valve device of claim 1, wherein the upper body and the lower body are coupled to the center body by an uneven structure.

4. The valve device of claim 1, further comprising an actuator coupling portion having a bar pillar shape, formed to pass through the valve cover from a center of a top surface of the upper body to protrude upwardly from the valve cover, wherein the actuator coupling portion is formed to have a noncircular cross-section.

* * * * *